United States Patent Office 3,437,456
Patented Apr. 8, 1969

3,437,456
STABLE DIBORANE DIAMMONIATE AND
METHOD OF PREPARING SAME
Joseph M. Makhlouf, Mars, Pa., assignor to Mine Safety
Appliances Company, a corporation of Pennsylvania
No Drawing. Filed Apr. 8, 1965, Ser. No. 448,567
Int. Cl. C01b 21/06, 35/00
U.S. Cl. 23—358     3 Claims

ABSTRACT OF THE DISCLOSURE

Diborane and ammonia are reacted in methylene chloride solvent at temperatures below about 0° C. to precipitate a diborane diammoniate stable at room temperature. The diborane diammoniate so formed is aged with excess ammonia in methylene chloride to form a diborane diammoniate of the form $(NH_3BH_2NH_3)(BH_4)$.

---

This invention relates to diborane diammoniate and a method for its preparation.

A variety of compounds of ammonia and diborane having the empirical formula $BNH_6$ are known, differing methods of carrying out the reaction yielding different products. Diborane diammoniate having the formula $(H_3NBH_2NH_3)(BH_4)$ has been prepared by the low temperature reaction, e.g. below −78° C., of diborane and excess ammonia wherein the excess ammonia is pumped from the reaction mixture at −78° C., which method is not adaptable to commercial scale production. (Parry et al., J.A.C.S. 80, 11 (1958)).

It is an object of this invention to provide a new method of preparing diborane diammoniate $$(H_3NBH_2NH_3)(BH_4)$$

directly from ammonia and diborane. Another object is to provide a method of preparing a diborane diammoniate $B_2H_6(NH_3)_2$, similar to $(H_3NBH_2NH_3)(BH_4)$. Another object is to provide a method of preparing $$(H_3NBH_2NH_3)(BH_4)$$

from $B_2H_6(NH_3)_2$. Other objects will be apparent from the following description and claims.

This invention is based on my discovery that diborane and ammonia react in methylene chloride to form a precipitate of $B_2H_6(NH_3)_2$ and that the said $B_2H_6(NH_3)_2$ is converted slowly to $(H_3NBH_2NH_3)(BH_4)$ in the presence of an ammonia solution in methylene chloride. The method is particularly advantageous in that it is direct, simple, reproducible and yields readily separable precipitated reaction products.

In an example of this invention, 60 mmols of ammonia was condensed into 200 ml. of methylene chloride contained in a suitable reaction vessel, and 30 mmols of diborane carried by a stream of $N_2$ was then bubbled into the ammonia-methylene chloride solution. A solid diborane diammoniate $B_2H_6(NH_3)_2$, precipitated promptly from the solution. The reaction mixture was allowed to warm to room temperature and the solid product was filtered from the reaction mixture and vacuum dried. The product so recovered was an 81.5% yield of substantially pure diborane diammoniate as determined by elemental analysis. Infra-red and x-ray analysis show the product to be different from $(H_3NBH_2NH_3)(BH_4)$, indicating that the $(H_3NBH_2NH_3)$ group is present but not the $(BH_4)$ group.

The $B_2H_6(NH_3)_2$ so produced was then returned to the reactor and was contacted at −78° C. with a solution of 60 mmols of ammonia in 200 ml. of methylene chloride for 40 hours, after which time the reaction mixture was warmed to room temperature and the solid product was filtered from the reaction mixture and vacuum dried. The product was substantially pure $(H_3NBH_2NH_3)(BH_4)$ as determined by elemental, infra-red and X-ray analysis.

The $B_2H_6(NH_3)_2$ and $(NH_3BH_2NH_3)(BH_4)$ have identical empirical formulas but different X-ray and infra-red patterns. They both evolve hydrogen only very slowly at room temperature, and the $B_2H_6(NH_3)_2$ is somewhat more stable than the $(NH_3BH_2NH_3)(BH_4)$.

$(NH_3BH_2NH_3)(BH_4)$ is only slowly reactive with methanol, to evolve hydrogen, while $B_2H_6(NH_3)_2$ reacts vigorously and rapidly with methanol. $(NH_3BH_2NH_3)(BH_4)$ reacts rapidly with HCl in ethyl ether while $B_2H_6(NH_3)_2$ is completely non-reactive.

In the preparation of $B_2H_6(NH_3)_2$ the proportions of ammonia and diborane used are not critical, but it is preferred to use the stoichiometric amounts, that is 2 mols of ammonia for each mol of diborane, as an excess of either reactant does not appear to give any special advantage. When an excess of ammonia is used, the $B_2H_6(NH_3)_2$ should be promptly separated from the reaction mixture to prevent the conversion to $$(NH_3BH_2NH_3)(BH_4)$$

Any temperature below about 0° C. and above the freezing point of methylene chloride may be used, but it is preferred to use a temperature of about −78° C. to facilitate solubility of the reactants. The filtration of the precipitated reaction product can be performed at reaction temperature or higher temperatures, such as room temperature, if desired.

In the conversion of $B_2H_6(NH_3)_2$ to $$(NH_3BH_2NH_3)(BH_4)$$

by contacting it with an ammonia solution of methylene chloride, temperature and ammonia concentration are not critical. Generally temperatures below about 0° C. are used, and solubility of ammonia is facilitated by using a temperature below its boiling point. It is generally preferred to use a solution containing a major proportion of methylene chloride and having at least about 15 mmols of ammonia for each 100 ml. of methylene chloride. The time required for substantially complete conversion depends somewhat on temperature, but generally requires aging for 36 hours or longer.

The preparation of $(NH_3BH_2NH_3)(BH_4)$ may be performed directly without the isolation of $B_2H_6(NH_3)_2$. For example, 108 mmols of $NH_3$ was condensed into 150 ml. of methylene chloride and 36 mmols of diborane carried by a stream of $N_2$ was bubbled into the solution, immediately forming a precipitate. The reaction mixture maintained at a temperature of −78° C. for 42 hours, after which time the precipitated product was filtered from the solution, washed in ether and vacuum dried. The product was over an 80% yield of substantially pure $(NH_3BH_2NH_3)(BH_4)$.

The $B_2H_6(NH_3)_2$ of this invention is useful for the generation of hydrogen by hydrolysis or alcoholysis. Hydrogen can be generated from $B_2H_6(NH_3)_2$ or $$(NH_3BH_2NH_3)(BH_4)$$

by spontaneous reaction when ignited at high temperatures. The diborane diammoniates may also be thermally decomposed to produce boron nitride. They are also useful as reducing agents and chemical intermediates for the preparation of other boron-nitrogen compounds, for example $B_2H_6(NH_3)_2$ reacts with methanol to form methyl borate $(MeO)_3B$ and ammonia borane $(NH_3BH_3)$.

According to the provisions of the patent statutes, I have explained the principle and mode of practicing my invention and have described what I now consider to be

I claim:

1. A method of preparing $(NH_3BH_2NH_3)(BH_4)$ which comprises the steps of contacting diborane and ammonia in methylene chloride at a temperature between about $-78°$ C. and $0°$ C. using in excess of about 2 mols of ammonia for each mol of diborane, the amount of methylene chloride being sufficient to form with the ammonia in excess of 2 mols for each mol of diborane a solution containing a major amount of methylene chloride and at least about 15 millimols of ammonia for each 100 milliliters of methylene chloride, aging the reaction mixture and recovering the precipitated $(NH_3BH_2NH_3)(BH_4)$ formed thereby.

2. A method according to claim 1 in which the temperature is about $-78°$ C.

3. A method of preparing $(NH_3BH_2NH_3)(BH_4)$ which comprises the steps of contacting diborane and a solution of ammonia in methylene chloride at a temperature between about $-78°$ C. and $0°$ C. using about 2 mols of ammonia for each mol of diborane, thereby forming a precipitate; aging said precipitate at a temperature between about $-78°$ C. and $0°$ C. in a solution of ammonia in methylene chloride containing a major proportion of methylene chloride and at least about 15 millimols of ammonia for each 100 milliliters of methylene chloride, and recovering the precipitated $$(NH_3BH_2NH_3)(BH_4).$$

References Cited

UNITED STATES PATENTS 3,278,267  10/1966  Marsh _____ 23—204

OTHER REFERENCES

Hurd: "Chemistry of the Hydrides," 1952, p. 84, John Wiley and Sons, Inc., New York.

Shore et al.: Large Scale Synthesis of $H_2B(NH_3)_2^+$ $BH_4^-$ and $H_3NBH_3$. Chem. Abs., vol. 61, August 1964, p. 5185(b).

Schlesinger et al.: The Reaction of Diborane With Ammonia at $-120°$ C. J.A.C.S., vol. 60 (1938), p. 294.

OSCAR R. VERTIZ, *Primary Examiner.*

HOKE S. MILLER, *Assistant Examiner.*